United States Patent Office 3,366,654
Patented Jan. 30, 1968

3,366,654
17-ALKOXYALKYL AND HYDROXYALKYL ETHERS OF 3 - SUBSTITUTED - 1,3,5(10) ESTRATRIENES
Gerhard R. Wendt, Havertown, and Kurt W. Ledig, Philadelphia, Pa., assignors to American Home Products Corporation, New York, N.Y., a corporation of Delaware
No Drawing. Filed Sept. 20, 1963, Ser. No. 310,485
6 Claims. (Cl. 260—397.5)

ABSTRACT OF THE DISCLOSURE

This invention is concerned with 17-(lower)alkoxy (lower)alkyl and 17-hydroxy(lower)alkyl ethers of 3-lower alkoxy-1,3,5(10)-estratrienes which are pharmacologically effective to regulate blood lipids and as hormones.

---

The present invention relates to certain new steroid compounds and to a method for preparing same.

More specifically stated, the present invention is concerned with the preparation and use of a novel series of steroid derivatives, particularly of the 1,3,5(10) estratriene type, which are principally and uniquely characterized by the presence of a functional ether group in position 17 of the nucleus of said compounds. The physical embodiments of the compounds of our novel series in the form of their composition of matter aspect have been discovered to demonstrate the ability to shift lipid levels in mammals, and consequently would appear to be of significant value in the treatment of hyperlipaemia and conditions related thereto.

It is a principal object of the present invention therefore to describe and claim a novel series of 17-ethers of 3-substituted-1,3,5(10)-estratrienes. It is an additional object of our invention to disclose the preparation and use of the active ingredients themselves as well as pharmacological formulae containing the same.

The invention sought to be patented in its composition aspect, therefore, is described as residing in the concept of a steroidal compound as generally indicated above which may be more particularly characterized by reference to the following structural formula:

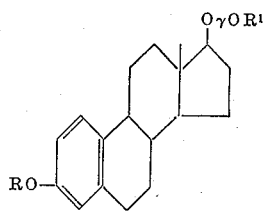

In reference to the structural formula above, the symbol R may represent a lower alkyl group of either normal or branched chain arrangement containing up to about 8 carbon atoms which may, of course, include such groups as methyl which is preferred or such groups as ethyl, propyl, isopropyl, heptyl and the like. Alternatively, R may also represent a cyclized lower alkyl radical such as a cyclopentyl and cyclohexyl group.

The group represented by $\gamma$ in our general formula is alkylene or a like group in general, and ethylene and 2,2-dimethylpropylene in particular. In the case of $R^1$, the substituent may be either hydrogen or a lower alkyl group of up to about 7 carbon atoms, such as methyl, ethyl, propyl and the like.

The tangible embodiments of the composition aspect of our invention possess the inherent general physical properties of being solids which are substantially insoluble in water but are soluble in polar solvents, such as lower aliphatic alcohols.

In the manner of preparation of the novel compounds of our invention the steroidal materials employed as starting materials in the conduct of our synthesis are generally previously disclosed in the chemical literature or are readily prepared by procedures known to those skilled in the steroidal art as outlined below.

The manner and process of making and using our invention will now be generally described so as to enable any person skilled in the art of chemistry to make and use a specific embodiment thereof.

According to our preferred mode of preparation, the physical embodiments of our inventive concept may be obtained by one or more reactions deriving from a starting material such as the 17-ketal of a 3-alkoxy, 3-aralkoxy, etc., ether substituted derivative of 1,3,5(10)-estratriene, the particular preparation of which is disclosed in Smith et al. application Ser. No. 219,135, filed Aug. 24, 1962, now Patent No. 3,138,588. In one method of preparation as more particularly detailed in Example 1 below, a starting material which may be typically estrone-3-methyl ether 17-cyclic ethylene ketal is reacted with a reducing agent such as lithium aluminum hydride-aluminum chloride. The reaction mixture is constantly stirred for about ½ hour and the final 17-ether product of our invention is obtained after processing through conventional purifying technique.

Alternatively, if one desires to prepare the members of the series wherein the substituent indicated by $R^1$ in the general formula above is an alkyl group, the 17-ether alcohol obtained in the manner indicated above is further treated with a suitable alkylating agent such as an excess of diazomethane in the presence of a suitable catalyst such as borontrifluoride etherate (as illustrated by specific Example 5) or diazoethane (illustrated by Example 6). However, these examples are intended to serve only as illustrations of large numbers of equivalently conventional alkylating agents which could be employed to derive the 17 alkyloxyalkyl substituted members of the series.

The manner of utilizing the invention sought to be patented will now be briefly described particularly as it relates to the employment of the physical embodiments resulting from the methods of preparation generally indicated above.

There has long been a desire to obtain compounds capable of lowering the cholesterol level of mammals, particularly man, in a continuing effort to reduce the incidence of athero sclerosis and related disturbances to the animal organism which are believed to bear a relation to such elevated cholesterol levels. In accord with a further aspect of the invention, it has been found in animal studies that the compounds prepared in the mode indicated above have a tendency, when administered to said mammals and birds, to shift the cholesterol from the blood therein. For example, the compound 17$\beta$-(2-hydroxyethoxy)-3-methoxyestra - 1,3,5(10) - triene has been found, when administered at a dose of 10 mg./kilogram to laboratory subjects such as rats and cockerels, to be effective agent in shifting cholesterol in the blood of these animals.

Besides having capacity to regulate blood lipids, the compounds of the invention are useful for their general hormonal effect, particularly in the female, and would therefore be expected to exhibit utility in those areas where natural estrogens are employed. When so utilized, the effective dosage of the compounds of this invention will depend upon the severity and the individual characteristics of each case wherein they are employed, and specific dosage will, of course, be determined by the attending physician or veterinarian. Generally a dosage range of from about 1.25 to about 40.0 mg. per kg. of body weight per day would constitute the overall range. Some of the preferred compounds of our invention are 17β-(2 - hydroxyethoxy) - 3 - methoxyestra-1,3,5(10)-triene; and 17β-(2-methoxyethoxy) - 3 - methoxyestra-1,3,5 (10)-triene.

The novel compounds of our invention in their concrete embodiment form may be administered in a number of ways, i.e. either orally, intravenously or intramuscularly. When contemplated for use in pharmaceutical products they, of course, can be administered singly or in combination with other active or inert ingredients in dosage unit form. If desired, they may be combined with a large number of compatible diluents, carriers, binders, and excipients to form a pharmaceutical preparation. Such typical liquid carriers as water, mineral oil, or a nontoxic alcohol may be admixed where preparations suitable for injection are to be the form of administration. Carboxymethyl-cellulose, starches, various sugars and the like may be employed where tablets or powders are to be compounded as a vehicle for oral administration.

The invention in its concrete embodiment aspects as well as the general concept of the compounds and processes involved in our invention will be illustrated by the following several examples. It is, of course, to be understood that the general nature of our invention is intended to include those compositions, uses, compounds and processes which would in the scientific opinion of the inventors be considered as substantial equivalents to the embodiments described in the hereinafter typical illustrations.

*Example 1.—d-17β-(2-hydroxyethoxy)-3-methoxyestra-1,3,5(10)-triene*

Stir a mixture of 60 ml. of ether, 8.0 g. of aluminum chloride, and 15 ml. of a 1 mole suspension of lithium aluminum hydride for 20 minutes and then add to a chilled solution of 9.85 g. of d-estrone-3-methyl ether 17-cyclic ethylene ketal in 1.1 of ether. Stir the reaction mixture in an icewater bath for 4 hours. Dilute with 2 N sulfuric acid until a clear solution results. Separate the ether layer and wash with saturated sodium bicarbonate solution. After the ether evaporates, treat the residue with a mixture of 200 ml. of alcohol, 5 ml. of hydrochloric acid and 10 ml. of water for 30 minutes on a steam bath. After the solvent evaporates, recrystallize the product obtained from alcohol, yielding 7.1 g.; (72.1%); M.P. 107–108°

I.R. 294μ; U.V. 278 mμ (2,100). Found: C, 76.50; H, 9.20. $C_{21}H_{30}O_3$: requires C, 76.32; H, 9.15%.

*Example 2.—d-17β-(2-hydroxyethoxy)-3-butoxyestra-1,3,5(10)-triene*

Substitute the starting material d-estrone-3-methyl ether 17-cyclic ethylene ketal of Example 1 with d-estrone-3-butylether-17-cyclic ethylene ketal, and proceed as described in Example 1. d-17β-(2-hydroxyethoxy)-3-butoxyestra-1,3,5(10)-triene is obtained as the product of this example.

*Example 3.—d-17β-(2-hydroxyethoxy)-3-cyclopentyloxyestra-1,3,5(10)-triene*

Substitute the starting material d-estrone-3-methyl ether 17-cyclic ethylene acetal by d-estrone-3-cyclopentyloxy-17-cyclic ethylene acetal, and proceed as described in Example 2. d-17β-(2 - hydroxyethoxy)-3-cyclopentyloxyestra-1,3,5(10)-triene is obtained as the product of this example.

*Example 4.—d-17β-(3-hydroxy-2,2-dimethylpropoxy)-3-methoxyestra-1,3,5(10)-triene*

Substitute the starting material d - estrone - 3 - methyl ether-17-cyclic ethylene ketal of Example 1 by d-estrone-3-methyl ether - 17 - cyclic 2,2-dimethyltrimethylene ketal and proceed as described in Example 1. d-17β-(3-hydroxy-2,2 - dimethylpropoxy)-3-methoxestra-1,3,5(10)-triene is obtained as the product of this example.

*Example 5.—d-17β-(2-methoxyethoxy)-3-methoxyestra-1,3,5(10)-triene*

Treat a solution of 3.0 g. of d-17β-(2-hydroxyethoxy)-3-methoxyestra-1,3,5(10)-triene in 150 ml. of ether with an excess of diazomethane in the presence of 0.2 ml. of freshly distilled borontrifluoride etherate. Let stand for 1 hour at room temperature, treat the reaction mixture with a few drops of acetic acid and extract with 10% sodium hydroxide solution, and finally with water and brine to give, after the evaporation of the solvent 3.0 g. of crude product. Recrystallization from methanol-water gives 2.5 g. of d-17β-(2-methoxyethoxy)-3-methoxyestra-1,3,5(10)-triene; M.P. 68–69°.

I.R. no —OH. Found: C, 76.94; H, 9.28. $C_{22}H_{32}O_3$ requires C, 76.70; H, 9.36%.

*Example 6.—d-3-butoxy-17β-(2-ethoxyethoxy)estra-1,3,5(10)-triene*

When treating d-3-butoxy-17β-(2-hydroxyethoxy)estra-1,3,5(10)-triene with diazoethane in place of diazomethane, and the reaction otherwise carried out as described in Example 5, d-3-butoxy-17β-(2-ethoxyethoxy)estra-1,3,5(10)-triene is obtained as the product of this example.

*Example 7.—d-3-cyclopentyloxy-17-(2-methoxyethoxy)estra-1,3,5(10)-triene*

When treating d-3-cyclopentyloxy-17-(2-hydroxyethoxy)estra-1,3,5(10)-triene with diazomethane as described in Example 5, 3-cyclopentyloxy-17-(2-methoxyethoxy)estra-1,3,5(10)-triene is obtained as the product of this example.

*Example 8*

In a manner of preparation similar to that outlined in Example 1 above the following final products may be obtained by employment of the starting materials indicated:

| Starting Material | Final Product |
|---|---|
| d-Estrone-3-ethyl ether 17-cyclic ethylene ketal. | d-17β-(2-hydroxyethoxy)-3-ethoxyestra-1,3,5(10)-triene. |
| d-Estrone-3-ethyl ether 17-cyclic 2,2-dimethyltrimethylene ketal. | d-17β-(3-hydroxy-2,2-dimethylpropoxy)-3-ethoxyestra-1,3,5(10)-triene. |

*Example 9*

Likewise proceeding in the manner taught by Example 5 above, the following final products may be obtained by employment of the starting materials shown:

| Starting Material | Final Product |
|---|---|
| d-17β-(2-hydroxyethoxy)-3-ethoxyestra-1,3,5(10)-triene. | d-17β-(2-methoxyethoxy)-3-ethoxyestra-1,3,5(10)-triene. |

In addition to the various uses to which our novel compounds may be adapted as more particularly noted above, it should be recognized that their use would in general extend to any of those areas recognized by those skilled in the steroid art as pertinent. It has even been noted that some of our novel compounds have activity in depressing the motor activity of the central nervous system of mammals. As a generality, their function would therefore not be limited to general hormonal activity but would extend to such areas related to or affected by such activity.

We claim:
1. 17β - (2-hydroxyethoxy)-3-methoxyestra-1,3,5(10)-triene.

2. 17β-(2-methoxyethoxy)-3-methoxyestra-1,3,5(10)-triene.

3. A compound having the formula

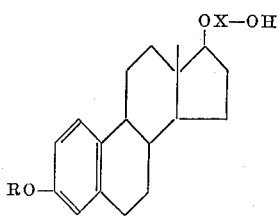

wherein R is lower alkyl; and X is lower alkylene.

4. A compound selected from the group consisting of those having the formula:

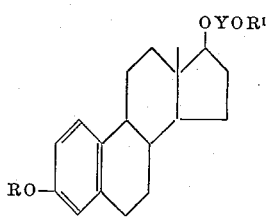

wherein R is lower alkyl; R¹ is selected from the group consisting of hydrogen and lower alkyl; and Y is lower alkylene.

5. A process for the preparation of compounds having the formula:

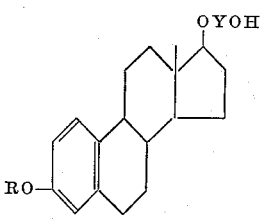

wherein R is lower alkyl and Y is lower alkylene which comprises contacting a compound of the formula:

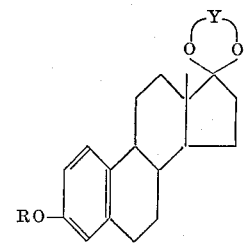

wherein R and Y are defined as above with lithium aluminum hydride and aluminum chloride for a period of about one-half hour.

6. A process for the preparation of compounds having the formula:

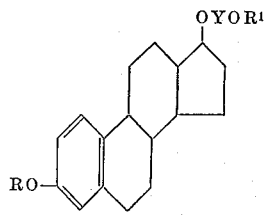

wherein R and R¹ are lower alkyl; and Y is alkylene which comprises contacting a compound of the formula:

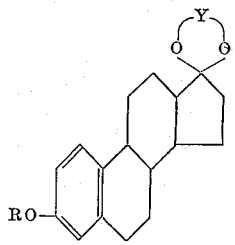

wherein R and Y are defined as above with lithium aluminum hydride and aluminum chloride for a period of about one-half hour to produce a compound of the formula:

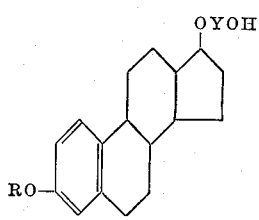

wherein R and Y are defined as above, which is then contacted with a diazoalkane, in the presence of boron-trifluoride etherate, for about one hour.

References Cited
UNITED STATES PATENTS
3,312,721  4/1967  Wendt et al. _____ 260—397.5

ELBERT L. ROBERTS, *Primary Examiner.*